UNITED STATES PATENT OFFICE.

WILHELM MAJERT, OF BERLIN, GERMANY.

BLUE DYE.

SPECIFICATION forming part of Letters Patent No. 440,953, dated November 18, 1890.

Application filed June 12, 1889. Serial No. 314,014. (No specimens.) Patented in Germany January 25, 1887, No. 41,934, and in England March 21, 1887, No. 4,243.

*To all whom it may concern:*

Be it known that I, WILHELM MAJERT, doctor of philosophy, a subject of the King of Prussia, German Empire, and residing at Berlin, Kingdom of Prussia, German Empire, have invented certain new and useful Improvements in and relating to the manufacture of Coloring-Matters, (for which I have received Letters Patent in England, No. 4,243, dated March 21, 1887, and in Germany, in the name of Ever & Pick, No. 41,934, dated January 25, 1887;) and I do hereby declare that the following is a full, clear, and exact description of the invention, which will enable others skilled in the art to which it appertains to make and use the same.

This invention relates to the preparation of azo coloring-matters.

According to the said invention—

First. Four parts of alpha-naphthyldisulpho-acid (obtained by the influence of two molecules of chlorhydrin of sulphuric acid, whose formula is $(C_3H_5)Cl(OH)OSO_3H$, (see *Fehling's Handwoerterbuch der Chemie*, Vol. III, page 438,) upon one molecule of alpha-naphthaline) or alpha-naphthaline alpha-sulpho-acid, are melted with three to four parts of hydrate of soda or caustic potash until on becoming liquid it develops hydrogen. The molten mass is then dissolved in water, when, by means of acid, the new dioxynaphthaline is separated, which melts at 248° to 252° Celsius. This new dioxynaphthaline was first discovered by me, and its production forms one feature of my invention.

Second. This dioxynaphthaline forms with sulphuric acid mono and bisulpho acids, as follows:

*a.* Ten kilograms of finely-powdered dioxynaphthaline are mixed together with twenty kilograms of concentrated sulphuric acid and kept for about one hour at 60° Celsius. The mass when almost solid is dissolved in water. The solution is then treated with milk of lime until it reacts neutrally, and from the salt of lime the soda salt of the dioxynaphthaline monosulpho-acid is made in the known manner.

*b.* Ten kilograms of dioxynaphthaline are heated to from 90° to 130° Celsius with concentrated sulphuric acid. From the bisulpho-acids thus obtained alkaline salts are formed in the well-known manner.

Third. The dioxynaphthaline, as well as its mono and bisulpho acids, forms with tetrazo compounds the following products:

*a.* The so-called intermediate products from one molecule of the tetrazo compound and one molecule of dioxynaphthaline, its mono or bisulpho acids, respectively. The intermediate compounds arise if the combinations are effected in such a manner that in the reaction a free acid is present or makes its appearance.

*Example.*—One molecule of tetrazodiphenylchloride dissolved in water is added to a solution of one molecule of monosodium dioxynaphthaline,

and one molecule of sodium acetate. The intermediate compound separated in blue flakes. If dioxynaphthaline is replaced by the salts of monosulpho-acids,

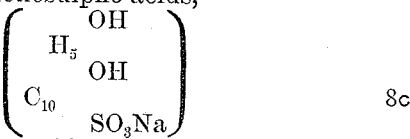

or the bisulpho-acids

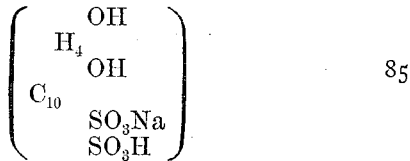

or

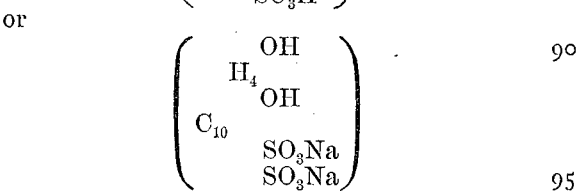

intermediate compounds of the type $C_6H_4N.N.C_{10}H_5OH,$
$C_6H_4NN—O,$

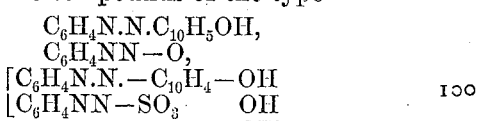

or

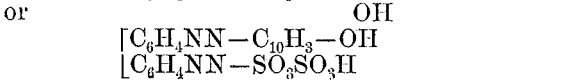

are also obtained.

Four. If the combination of one molecule of a tetrazo compound and one molecule of the dioxynaphthaline or its mono and its bi sulpho-acids, respectively, in presence of carbonated or caustic alkalies are taken, then coloring-matter is obtained directly.

*Example a.*—One molecule of tetrazo-ditolyl chloride dissolved in water is added to a solution of one molecule sodium dioxynaphthaline and two molecules of sodium carbonate or caustic soda dissolved in water. The coloring-matter precipitates and dyes non-mordanted cotton violet.

*Example b.*—The dioxynaphthaline of the above example is replaced by the neutral sodium salt of a dioxynaphthaline sulpho-acid,

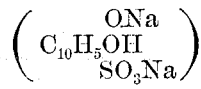

The coloring-matter is very difficult to dissolve in water, and dyes blue-violet.

Five. One molecule of a tetrazo compound and two molecules of dioxynaphthaline or its mono or bi sulpho-acids form blue coloring-matter.

*Example a.*—One molecule tetrazo-stilben chloride, two molecules dioxynaphthaline, and three molecules of sodium carbonate, all dissolved in water are mixed together. The coloring-matter is not precipitated by salt and dyes non-mordanted cotton blue.

*Example b.*—The watery solutions of one molecule of tetrazo-diphenyl chloride, two molecules of sodium salt of dioxynaphthaline sulpho-acid, and three molecules of carbonate of sodium are mixed together, giving rise to a blue coloring-matter.

*Example c.*—If the dioxynaphthaline sulpho-acid is replaced by a dioxynaphthaline disulpho-acid a blue coloring-matter is obtained.

Six. The intermediate compounds obtained in one may be combined with one molecule of salicylic acid, alpha or beta naphthol, its mono or bi sulpho-acids, respectively, alpha-dioxynaphthaline, its mono or bi sulpho-acids, respectively.

*Example.*—The intermediate compound out of one molecule tetrazo-diphenyl and one molecule of dioxynaphthaline sulpho-acid suspended in water is treated with a solution of one molecule of the sodium salt of alpha-naphthosulpho-acid, and then with two molecules of hydrate of soda blue-violet dying color is formed at once.

Seven. The same compound as preceding are obtained also if the intermediate compound from one molecule of tetrazo compound and one molecule salicylic acid, alpha or beta naphthol, their mono or bi sulpho-acids, respectively, are compounded with one molecule of dioxynapthaline, its mono or bi sulpho-acids, respectively.

Instead of sulphuric acid one can make use of fuming sulphuric acid or sulphuric acid chlorhydrin for the reduction of the dioxynaphthalin into the sulpho or bisulpho acids.

By tetrazo compound, wherever mentioned in this specification, I understand the tetrazo compound which is formed by nitrous acid with benzidin, tolidin, diamido-stilben, diamidonaphthalen, dianisidin, diamidodiphenetol, diamidobenzophenon, as well as the mono and bisulpho acids of these bodies.

My dioxynaphthaline, as well as its derivatives, differs essentially from the isomeric compounds heretofore described, as will appear from the following summary. The naphthyl disulpho-acid of Ebert and Merz (*Ber.* 9,592) forms deliquescent crystals. The soda salt of the same crystallizes in brilliant needles and dissolves in the ratio of one part of the salt to 2.2 parts water at 18°. The naphthyl disulpho-acid cannot be confounded with the naphthyl disulpho-acid employed by me, inasmuch as it is not transformed into dioxynaphthaline when treated with alkalies, but forms a naphthol sulpho-acid under such treatment. The naphthyl disulpho-acid (Armstrong's) which I employ crystallizes in brilliant white scales, which are not hygroscopic. Its soda salt separates from the water in scales or laminæ. One part of the same dissolves in 7.99 parts water at 19°. In melting the soda salt with from four to six times the quantity of caustic soda or potash at about 180° it yields a new naphthyl disulpho-acid; but when the temperature is raised to from 220° to 250° the second sulpho group is separated. The result is obtained by digesting the disulpho-acid with concentrated soda-lye under pressure at the stated temperatures. The resulting dioxynaphthaline dissolves in water with difficulty, but readily in alcohol. By analogy with the disulpho-acid, from which it is obtained, it is termed alpha-dioxynaphthaline. It crystallizes from water in narrow scales and sublimates in long needles. Its melting-point, both in the crystalline and sublimated form, is between 248° and 252°. In melting it becomes brown. The dioxynaphthaline described by Darmstädter, (*Ann.* 152,306,) on the other hand, turns black below 200° without melting; exposed to air it turns violet. The isomeric compound which I have obtained, however, does not change in the air, nor does its aqueous solution fluoresce, as the authors named claim for their products. There can be no identity between the new dioxynaphthaline and that obtained by Ebert and Merz (*Ber.* 9,609) from naphthyl disulpho-acid, inasmuch as the original substances, as well as the melting-points of the two compounds, essentially differ. Ebert and Merz have found the latter constant and at 186°. Nor are the reactions of the two dioxynaphthalines the same. The solution of my dioxynaphthaline shows no red coloring. The dioxynaphthaline obtained from naphthyldisulpho-acid shows the reverse result. With tetrazodiphenyl chloride the first yields a deep blue pigment or dye, the other isomeric compound yielding violet tints. Its action with sulphuric acid is also very characteristic of the new compound, which forms a monosulpho-acid when treated with two parts sulphuric acid at the temperature of the water bath, while the isomeric compound produced by Darmstädter and Wichelhaus, which approaches the nearest in characteristics to the new dioxynaphthaline, yields a disulpho-acid under the same treatment. Moreover, the alpha-dioxynaphthaline, as well as its sulpho-acids, forms dyes with tetrazo compounds which are characterized by the blue color which they impart to cotton, linen, and jute in an alkaline bath.

Having now particularly described and ascertained the nature of my said invention and in what manner the same is to be performed, I declare that what I claim is—

1. The process of preparing a dioxynaphthaline melting at from 248° to 252° Celsius, which consists in melting alpha-naphthyldisulpho-acid or alpha-naphthaline alpha-sulpho-acid with caustic soda or potash, substantially as described.

2. The process of preparing a dioxynaphthaline melting at from 248° to 252° Celsius, which consists in melting alpha-naphthyldisulpho-acid with caustic potash or soda, dissolving the molten mass in water, and separating the dioxynaphthaline by means of acid, all substantially as described.

3. A new dioxynaphthaline having a melting-point between 248° and 252° Celsius, substantially as described.

4. The process of preparing mono or bisulpho acids of dioxynaphthaline, which consists in treating the dioxynaphthaline, which melts between 248° and 252° Celsius, with concentrated sulphuric acid, fuming sulphuric acid, or sulphuric chlorhydrin, substantially as described.

5. The process of producing blue coloring-matter, which consists in treating a tetrazo compound with a dioxynaphthaline which melts between 248° and 252° Celsius, or its mono or bisulpho acids, all substantially as described.

6. The process of producing blue coloring compounds, which consists in melting alpha-naphthyldisulpho-acid with caustic soda or potash, then treating the dioxynaphthaline so obtained with concentrated sulphuric acid, fuming sulphuric acid, or sulphuric chlorhydrin, and then adding the sulpho-acid of dioxynaphthaline so obtained to tetrazo-diphenyl chloride in the presence of carbonate-sodium, all substantially as described.

In witness whereof I have hereunto set my hand in the presence of two witnesses.

WILHELM MAJERT.

Witnesses:
B. ROI,
ALVIS SIEBER.